United States Patent
Den Besten et al.

(10) Patent No.: US 6,549,595 B1
(45) Date of Patent: Apr. 15, 2003

(54) HIGH-SPEED SERIAL DATA COMMUNICATION SYSTEM

(75) Inventors: Gerrit W. Den Besten, Eindhoven (NL); Marcellinus J. M. Pelgrom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/222,397

(22) Filed: Dec. 29, 1998

(30) Foreign Application Priority Data

Jul. 24, 1998 (EP) .......................................... 98202487

(51) Int. Cl.$^7$ ................................................ H04L 7/02
(52) U.S. Cl. ........................................ 375/360; 375/355
(58) Field of Search ............................. 375/360, 359, 375/354, 355, 242; 341/71

(56) References Cited

U.S. PATENT DOCUMENTS

| | | | |
|---|---|---|---|
| 3,889,236 A | | 6/1975 | Herger et al. ............. 340/172 |
| 3,961,367 A | * | 6/1976 | Wu ............................. 360/44 |
| 4,369,516 A | * | 1/1983 | Byrns ........................ 375/359 |
| 4,520,346 A | * | 5/1985 | Shimada .................... 341/58 |
| 4,680,787 A | * | 7/1987 | Marry ........................ 455/557 |
| 4,928,289 A | * | 5/1990 | Dingeman ................. 341/55 |
| 5,323,463 A | * | 6/1994 | Speiser ...................... 375/359 |
| 5,341,371 A | | 8/1994 | Simpson .................... 370/85.4 |
| 5,614,901 A | * | 3/1997 | Haas .......................... 341/102 |
| 6,044,421 A | * | 3/2000 | Ishii .......................... 375/288 |

FOREIGN PATENT DOCUMENTS

EP 0458648 A2 11/1991

OTHER PUBLICATIONS

"Modern Communication Systems", XP 002118135, p. 165.
The Mobile Communication Handbook, XP 002118136 p. 84, and 90–91.

* cited by examiner

*Primary Examiner*—Stephen Chin
*Assistant Examiner*—David B. Lugo
(74) *Attorney, Agent, or Firm*—Steven R. Biren (57) ABSTRACT

A serial communication system transfers respective first and second signals via respective parallel signal carriers from a transmitter circuit to a receiver circuit. In synchronization with a clock signal (150), the transmitter circuit (110) serially represents a combination of the clock signal and data bit(s) (160) of a data message as the first and second signals (130, 140). At a data bit boundary, the transmitter circuit effects a transition of the first signal (130) if the data bit to be transmitted has a first value and effects a transition of the second signal (140) if the data bit has a different second value. The receiver circuit (120) recovers the clock signal by detecting and combining signal transitions of the first and second signal, for instance using an XOR function, and recovers the data message from the first and/or the second signal.

18 Claims, 3 Drawing Sheets

HIGH-SPEED SERIAL DATA COMMUNICATION SYSTEM

BACKGROUND OF THE INVENTION

The invention relates to a serial communication system comprising at least one transmitter circuit and at least one receiver circuit interconnected via a communication medium; the communication medium providing at least a first and a second parallel signal carrier for transporting a respective first and second signal from the transmitter circuit to the receiver circuit;

the transmitter circuit comprising means to, in synchronization with a clock signal, serially represent a combination of the clock signal and data item(s) of a data message as the first and second signal such that at a data item boundary a signal transition occurs of either the first or the second signal; and the receiver circuit comprising means to recover the clock signal by detecting and combining signal transitions of the first and second signal and to recover the data message from the first and/or the second signal.

The invention further relates to a transmitter apparatus and receiver apparatus for use in such a system.

The invention also relates to a method of serially communicating between at least one transmitter circuit and at least one receiver circuit interconnected via a communication medium; the communication medium providing at least a first and a second parallel signal carrier for transporting a respective first and second signal from the transmitter circuit to the receiver circuit; the method comprises:

in synchronization with a clock signal, serially encoding a combination of the clock signal and data items(s) of a data message as the first and second signal such that at a data item boundary a signal transition occurs in either the first or the second signal;

outputting the first and second signal from the transmitter circuit via the respective signal carriers;

inputting the first and second signals from the respective signal carriers into the receiver circuit; and decoding the first and second signals to recover the clock signal by detecting and combining signal transitions of the first and second signal; and recovering the data message from the first and/or the second signal.

Such a serial communication system and method are known from U.S. Pat. No. 5,341,371. This system discloses a high-speed communication interface connecting a transmitter and a receiver circuit via two parallel signals, referred to as the data signal and strobe signal respectively. Under control of a clock, data bits of a data message are output serially. The data bit is presented in a conventional binary form, where a zero data bit is transmitted as a low signal level and a one data bit as a high signal level. A transition occurs in the data signal only when the data changes. A half-period clock signal is used of which both edges of the clock signal are used. The half-period clock signal is represented in the strobe signal. The transmitter only effects a signal transition on the strobe signal when there is no transition on the data signal. The receiver recovers the clock signal by combining transition information from both the strobe signal and the data signal. The receiver retrieves the data bits by sampling the data signal under control of the recovered clock.

The known system discloses a higher-level communication protocol, where information is transferred via the bus in the form of tokens. A token starts with a parity bit, followed by a bit indicating whether the token carries a data byte or is used for control purposes. Consequently, a data byte is transferred using a ten-bit token. The system allows transfer of variable length messages, where a message consists of one or more bytes. An N-byte message is sent as a succession of N tokens each carrying a data byte. To indicate the end of a message, a special end-of-packet or end-of-message token of three bits is sent.

SUMMARY OF THE INVENTION

It is an object of the invention to provide an alternative low-cost, high-speed communication system, transmitter and receiver apparatus for use in such a system, and communication method.

To meet the object of the invention, the transmitter circuit is operative to cause a transition of the first signal at a data item boundary preceding data item d of the data message if a function f(d) of the data item d has a first value and to cause a transition of the second signal at the data item boundary if the function f(d) has a different second value. In this way a system is achieved, where both signals are used in a similar and complementary way to represent f(d), enhancing the symmetry of the system. The binary value of f(d) determines in which signal a transition occurs. Recovery of the clock is possible since during the transfer of a data message at each data bit boundary always one of the signals changes level. The recovery may, for instance, be based on a simple XOR operation. During the transfer of a data message both signals on average change level at half the nominal clock frequency (transitions occur only at data bit boundaries), ensuring a low frequency signal. During the transfer of a data message it is avoided that both signals change level at a data bit boundary.

The value of the function f(d) may simply be the data bit itself (f(d)=d), requiring no additional logic for encoding/decoding the data bit. Alternatively, simple binary logic may be used which does not negatively affect the bit-rate of the system. As an example, f(d) may be a binary combination, such as XOR, of the data bit d with at least one bit of a predetermined codeword. The codeword may, for instance, be used to increase security of the system. For more secure systems, the function f(d) may be based on more advanced cryptographic principles such as a stream cipher. This may, however, affect the bit-rate.

In a preferred embodiment, the receiver determines the value of f(d) by detecting whether a transition occurred in the first or second signal. To this end, the receiver may comprise means for detecting a rising/falling edge in one or both signals. If at a moment that substantially coincides with a data bit boundary, as indicated by the recovered clock, no edge is detected in one of the signals this can be seen as implying that the edge must have occurred in the other signal. As such the symmetry of the system makes it sufficient to detect whether a transition occurred in only one of the signals.

In a further embodiment, the recovered clock signal is used to sample the signal in a reliable and simple way. The stable signal level of two successive samples is compared to determine in a simple way whether a transition has occurred or not.

In a further embodiment, error detection is performed by recovering the data from both signals and comparing the outcome. In this way certain transmission errors, such as one-bit errors, can be detected without using a parity bit. This simplifies the protocol and saves a bit location on the bus compared to the prior art system.

In a further embodiment, it is determined whether a transition occurred by comparing successive samples after converting the serial stream of samples to a parallel word. In this way the comparison is less time-critical and can be performed at a lower frequency.

In a further embodiment, the system is made highly suitable for transferring a stream of data messages (also referred to as words), such as for instance is the case for transferring audio or video data. The system is capable of transferring such data in a synchronous manner, with a simple detection of the end of a word. Lack of one or more transitions in the signal is used to indicate the boundary (beginning/end) of a word. In principle, such a detection can already be performed after a duration of little more than one data bit period following the last transition. Moreover, a 'gap' in the transitions can be generated and detected in a very simple manner. This compares favorably with the system of U.S. Pat. No. 5,342,371, where a special 3-bit token needs to be generated and detected. Furthermore, the system according to the invention allows variable word lengths at bit boundaries and is not restricted to word-lengths limited to a multiple of 8-bits. This makes the system according to the invention particularly suitable for the transfer of audio or video data, where data words which are not aligned at byte boundaries are commonly used.

It will be appreciated that the communication system allows low-cost, high-speed transmission of, particularly, audio/video data. Depending on the implementation, with low-cost transmitter and receiver circuits transmission rates of over 500 megabits per second can easily be achieved. As such, the system is very suitable for use within a consumer electronics device, for instance connecting a signal processor to an AID or D/A converter. The system can also be used for connecting CE equipment or for coupling a computer to a peripheral devices, such as monitors, printers, scanners and cameras.

To meet the object of the invention, a transmitter apparatus comprises a transmitter circuit comprising means to, in synchronization with a clock signal, serially represent a combination of the clock signal and data item(s) of a data message as a first and second signal, for transfer to a receiver circuit, such that at a data item boundary a signal transition occurs of either the first or the second signal; characterized in that the transmitter circuit is operative to cause a transition of the first signal at a data item boundary preceding data item d of the data message if a function f(d) of the data item d has a first value and to cause a transition of the second signal at the data item boundary if the function f(d) has a different second value.

To meet the object of the invention, a receiver apparatus comprises a receiver circuit comprising means:

to receive a first and second signal from a transmitter circuit;

to recover a clock signal by detecting and combining signal transitions of the first and second signal; and to recover a data message from the first and/or the second signal; characterized in that the receiver circuit is operative to determine whether substantially at a data item boundary, as derived from the recovered clock signal, a transition occurred in the first or the second signal and to determine that a data item with a first value has been received if a transition occurred in the first signal and that a data item with a different second value has been received if a transition occurred in the second signal.

To meet the object of the invention the method is characterized in that the encoding comprises causing a transition of the first signal at a data item boundary preceding data item d of the data message if a function f(d) of the data item d has a first value and causing a transition of the second signal at the data item boundary if the function f(d) has a different second value.

These and other aspects of the invention will be apparent from and elucidated with reference to the embodiments shown in the drawings.

DETAILED DESCRIPTION OF THE PREFERRED EMBODIMENT

Figure 1:
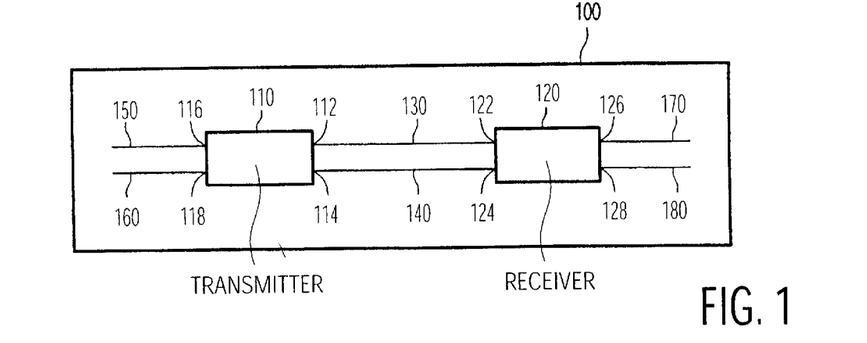
FIG. 1 shows a block diagram of a system 100 according to the invention.

FIG. 1 shows a block diagram of a system 100 according to the invention. The system comprises a transmitter circuit 110 and a receiver circuit 120. The transmitter circuit 110 comprises encoder means for generating a first signal 130 and a second signal 140 on two respective outputs 112 and 114. The first and second signals 130 and 140 in combination represent a clock signal 150 and a data signal 160 synchronous to the clock signal 150. In the example of FIG. 1, the transmitter circuit 110 comprises inputs 116 and 118 for, respectively, receiving a separate clock signal 150 and a data signal 160. As an example, audio or video data may be received from a DSP, an A/D converter, or a decoder. Similarly, general-purpose data may be received from a processor in a computer or from a storage controller. It will be appreciated that the transmitter circuit 110 may, alternatively, generate the clock and/or data internally. The transmitter circuit 110 may alternatively receive the data in a parallel form, e.g. from a memory, and convert the parallel data to a serial stream under control of the clock signal 150 or an internal clock. The receiver circuit 120 comprises inputs 122 and 124 for receiving the first signal 130 and the second signal 140 respectively. The receiver circuit 120 comprises decoder means for decoding the first and second signal 130, 140 to retrieve a clock signal 170 and data signal 180, representing the original clock signal 150 and data signal 160 respectively. The receiver circuit 120 may comprise outputs 126 and 128 for outputting the retrieved signals, for instance to a DSP, processor, D/A converter or I/O controller. The receiver circuit 120 may also comprise means for internally processing one or both of the retrieved signals (for instance, converting the serial data stream to parallel words, which are stored in a memory, and discarding the clock signal).

It will be appreciated that the transmitter circuit 110 and the receiver circuit 120 may be located in one device, such as a computer or CE device, for transferring data within the device. In such a configuration, the circuits are preferably integrated with the respective source or sink of the data. For instance, the transmitter circuit 110 may be integrated with an A/D converter and the receiver circuit 120 may be integrated with a D/A converter, whereas a DSP may comprise both a transmitter circuit 110 and a receiver circuit 120.

For use in the same device the first and second signals 130 and 140 may be passed from the transmitter circuit 110 to the receiver circuit 120 via respective lines on a PCB, using suitable line drivers. The systems according to the invention may even be used for communication between dies on a MDP (Multi-Die Package) or MCM (Multi-Chip-Module). Alternatively, the circuits may be located in separate devices using an external communication medium. The medium supplies two parallel carriers for carrying the respective first and second signal. Such a carrier may, for instance, be formed by an electrical conductor. For high-speed external transmission, preferably differential transmission is used for each of the carriers. Obviously, other techniques, such as frequency modulation, also may be used to obtain two parallel transmission channels. Instead of a wired communication medium, a wireless medium also may be used. Suitable drivers for the various media are available and are not a part of the invention.

Figure 2A:
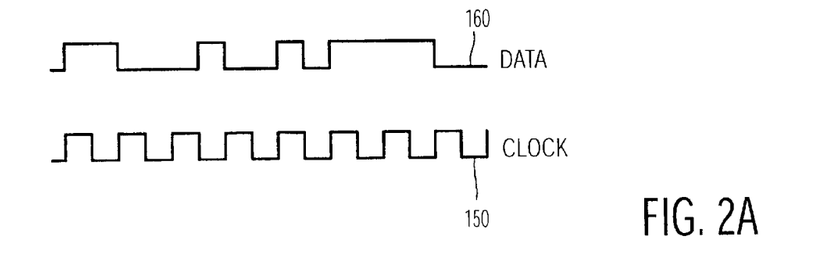
FIG. 2 illustrates the signal encoding according to the invention.

FIG. 2 illustrates the signal formats. FIG. 2A shows an example of the clock signal 150 and data signal 160 as may be provided to the transmitter circuit 110 (and may be output by the receiver circuit 120 as the respective signals 170 and 180). Shown is a half-frequency clock signal 150 (a complete clock pulse lasts two data bit periods; the clock frequency is half the data bitrate). Both edges of such a clock signal are used. It will be appreciated that also a full frequency clock signal may be used. However, as will be described in more detail below advantageously a transmitter circuit 110 and receiver circuit 120 operating at the shown half-frequency clock signal can be used, consuming less power. The data signal 160 of FIG. 2A is shown in a conventional binary format, synchronous to the clock signal 150.

Figure 2B:
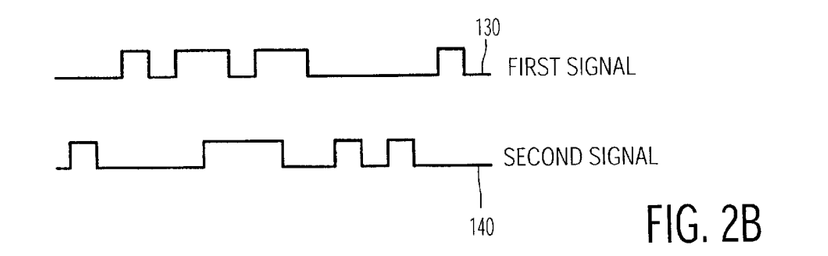

FIG. 2B shows the encoded signals 130 and 140, respectively, as exchanged in the system according to the invention. If a data bit d to be transmitted next has a binary value "0", the transmitter circuit 110 effects a transition of the level of the first signal 130. If, on the other hand, the data bit d has a binary value "1", the transmitter circuit 110 effects a transition of the level of the second signal 140. The transition is effected in synchronization with the clock signal 150 (triggered by an edge of the shown clock signal). All edges of the clock signal 150 are represented in the signals 130 and 140 in combination. Within a data bit period no other transitions occur in either of the signals 130 and 140. Moreover, each clock edge is represented only once during a bit period, allowing for a minimum frequency transmission.

It will be appreciated that for the first data bit of a data message (word) the initial level of the signals 130 and 140 may still be chosen. For instance, a default level may be chosen. Such an approach is particularly useful if successive messages can be generated by different transmitter circuits. If, however, one transmitter circuit generates a stream of variable length data messages, separated using the word-separation technique as described below, it is preferred to keep the level at which the last message ended as the initial level. In this way it is avoided that the levels have to be reset to the default level, requiring additional time and transition (s). In FIG. 2B it is assumed that both signals were at an initial "low" level. It will be appreciated that "low" and "high" may be reversed without affecting the system.

Taking the data message of FIG. 2A as an example:
Message word: 1100010010111100,
The encoding according to the invention provides the following, where T indicates a transition and N indicates no transition:

First signal: NNTTTNTTNTNNNNTT
The second signal transition information is simply the reverse.
Starting from a low level, this results in the following levels, where L indicates a low level and H indicates a high level:
First signal: LLHLHHLHHLLLLLHL
Second signal: HLLLLHHHLLHLHLLL
This corresponds to the signal levels illustrated in FIG. 2B.

In FIG. 2 a data bit "0" results in a transition of the first signal 130. It will be appreciated both signals 130 and 140 may equally well be exchanged, where a data bit "1" results in a transition of signal 130. It will also be understood that instead of transmitting binary data also data with more levels may be transmitted using the same concept. For instance, a four-valued data item (two bits combined) may be transferred using four parallel signals, each signal dedicated to one of the values (i.e. a transition of the signal indicates the corresponding value). Alternatively, two parallel signals each with three signal levels may be used. In such a system, a "0" may be represented using one level change on the first signal; a "1" by two level changes on the first signal; a "2" by one level change on the second signal and a "3" by two level changes on the second signal. Using three levels, indicated by L (low), M (medium), and H (high), a one level change could be represented by: L to M, M to H, and H to L (cyclic change). Similarly, a two level change could be represented as: L to H, M to L; H to M. Using two signals to represent four values results in a clock signal which is halved again in frequency. For reasons of simplicity, the signals of FIG. 2B will be referred to in the remainder of the description.

The encoder of the transmitter circuit 110 can be implemented in various ways. Interpreting a low level of the second signal 140 as "0", then the following table shows how the new level of the second signal can be derived from the existing level of the second signal and the data bit to be transmitted:

|  |  | Existing second signal level |  |
|---|---|---|---|
| New second signal level |  | 0 | 1 |
| Data bit | 0 | 0 | 1 |
|  | 1 | 1 | 0 |

The table shows that the new level of the second signal 140 can simply be obtained as an XOR of the existing level and the data bit to be transmitted.

It will be recalled that if the second signal 140 changes level, the first signal 130 does not change level. Assuming that both signals are at the same initial level before starting transmission of the message, it follows that the level transmitted as the first signal 130 for the first data bit (numbered $b_0$) of the message is the inverse of the level of the second signal 140. For the second bit ($b_1$), only the signal changes making the signals equal. This continues for the remaining bits. As such, the first signal 130 can be derived from the second signal by inverting the 'even' numbered levels (i.e. those levels representing $b_0$, $b_2$, $b_4$, . . . ) and keeping the 'odd' numbered levels (i.e. those levels representing $b_1$, $b_3$, $b_5$, . . . ) the same. It should be noted that this way of deriving the signals from each other can also be used for the encoding shown in U.S. Pat. No. 5,341,371.

It will be appreciated that in a similar way as shown in the table the new first signal level can also be derived from the existing first signal level and the data bit to be transmitted.

The decoder in the receiver circuit 120 can retrieve the clock signal 150 by detecting the edges in both signals 130 and 140. In the encoding shown in FIG. 2B, the clock signal 150 can, alternatively, simply be retrieved by XOR-ing the first and second signal 130 and 140 together. The data signal 160 can be retrieved by detecting whether a transition occurred in the first signal 130, representing a "0" data bit or in the second signal 140, representing a "1" bit. This retrieval can also be performed by using edge detection. If so, it may not be required to retrieve the clock signal separately if the clock signal is not used for other purposes in the receiving circuit or other functions at the receiving end. The retrieval can also be performed by using the retrieved clock signal to sample one (or both of the signals) and using two successively sampled values to determine whether or not a transition has occurred. For instance, XOR-logic may be used to compare the successive samples. If the samples are the same, the XOR-logic produces a "0"; otherwise a "1" is produced. If XOR logic is used, preferably the second signal 140 is sampled. In this case, a signal transition indicates that a "1" bit was transmitted. As such, the XOR logic directly produces the data bit. If the first signal 130 is sampled an additional inverter is required (or an XNOR gate instead of the XOR gate and inverter). As will be clear, sampling either one of the signals is sufficient. For reasons of error detection both signals may be sampled and the results compared. Preferably, the comparison occurs after the signal samples have been converted to data bits. Since the conversion/decoding is required anyhow, in this way additional logic for comparing the different samples of both signals is avoided.

The system according to the invention can be used as a point-to-point, uni-directional communication system, where one transmitter sends data to one receiver. The system may also be used as a one-to-many distribution system with one transmitter and one or more receivers. In principle, more than one transmitter can be used. In such a situation some higher order mechanism is required to ensure that transmission initiated by two or more transmitters do not interfere with one another. various techniques, such as token passing, CSMA/CD or bit arbitration, are known to avoid or deal with such situations. As such, the transmission scheme according to the invention can also be used in bi-directional, multi-master systems.

Particularly if the system according to the invention is used to transfer a stream of data messages (words), such as is commonly the case for audio/video data, advantageously the following word separation technique can be applied. The transmitter circuit 110 ensures that messages of a stream of messages are separated by a gap in the transitions, where for a duration of at least one data bit period since the last transition no new transition occurs. During this 'delay period' the transmitter circuit maintains the first and second signal at a substantially constant level. As a consequence at least one edge of the clock signal is not represented in the signals. The delay of at least one bit period is measured with reference to the clock signal 150. The receiver circuit 120 detects the lack of a clock edge shortly after one data bit period has expired since the last transition. In principle, a delay of one bit period is sufficient. However, it is preferred to use a delay of two bit periods to allow a simple/reliable implementation of the receiver circuit. Use of a two-bit delay allows an implementation with a one bit tolerance (instead of for instance a half bit tolerance for a shorter delay period). Moreover the clock parity remains the same. Consequently, an N-bit word is transmitted using N+2 data bit periods on the bus. It is preferred that the signals are kept at a constant level as transmitted during the last bit of the just completed message. Particularly in systems where successive words may be transmitted by different transmitters, it may be beneficial to use a default constant level which does not depend on the last message. This however may lengthen the delay duration by one bit, since a transition to this default level may be required after the last bit of the message has been transmitted. If use is made of a constant level, the level itself is preferably used to provide additional information with respect to the preceding or following word. For example, the constant level of the first and/or second signal may be used to identify specific words of the stream, allowing synchronization. For audio, the constant level(s) are preferably used to identify the various audio words, such a left, right, center or surround.

It will be appreciated that the variable length word-indication according to the invention allows in principle transmission of data messages of any number of data bits. The number of data bits is not restricted to, for instance, a multiple of eight bits. In a practical implementation a minimum length of, for instance, two to four bits may be required for a simple implementation of the receiver circuit. If for instance a minimum of two bits is guaranteed, the first two sampling cells of a sampling register need not be reset (they will be overwritten), allowing for a reset period of almost two data bits of the remaining cells of the sampling register. Depending on the implementation of the a clock locking circuit, it may be preferred to have a minimum number of four data bits (i.e. four transitions) to allow accurate locking to be able to reliable detect a word ending for a succession of small words. Preferably, a message (word) is sent with the most significant bit (MSB) first. In this way, the transmitter and receiver can in a simple way support different word lengths. For instance, the transmitter may use 20 bit audio words or 32 bit video words, whereas the receiver supports only 16 bit audio words or 24 bits video words, or vice versa. The transmitter circuit simply transfers all bits of the word and indicates the ending of the word afterwards. If the receiver circuit 120 supports a larger size word than actually transferred, the receiver circuit 120 ensures that, after a serial to parallel conversion, the least significant bit(s) for which no data bits were received are set to a default value, such as "0". This is preferably implemented by initially clearing a parallel reception register and filling the register with data bits of a newly received word starting at the MSB of the register. This automatically leaves the LSB storage cells of the register at the reset value. The register is then read out in response to the receiving circuit 120 receiving an indication of a word ending. The read-out can then be followed by resetting the register again. If it is known beforehand that all messages of a sequence will be same-size, this last clearing is not required, since the data in the used MSB cells of the register will automatically be overwritten and the not-used LSB cell(s) will remain at the default value. On the other hand, if the receiver circuit 120 supports a smaller size word than actually transferred, the receiver circuit 120 ensures that after the supported number of sampled values (or data bits, i.e. decoded samples) has been received, no more samples or data bits are stored. This may, for instance, be implemented using a counter which after the desired number of samples/data bits have been stored blocks the clock signal from effecting a further storage operation. This function can also be simply achieved as part of the serial-to-parallel conversion as described below.

The technique of indicating word ending can be implemented in various ways. For instance, assuming that a 'word-select' signal is supplied to the transmitter circuit 110 indicating the word ending (and optionally the word start), this signal may be used to halt the supply of the encoded signals to the respective outputs for the required delay period. This results in the outputs being maintained at the same constant level as used for the last data bit. In the receiver circuit 120, preferably, a delay locked loop is used for controlling the comparison of the retrieved clock signal with a one data bit period delayed clock signal. If the comparison shows that no transition has occurred in the clock signal, this signals the end of a word.

Figure 3:
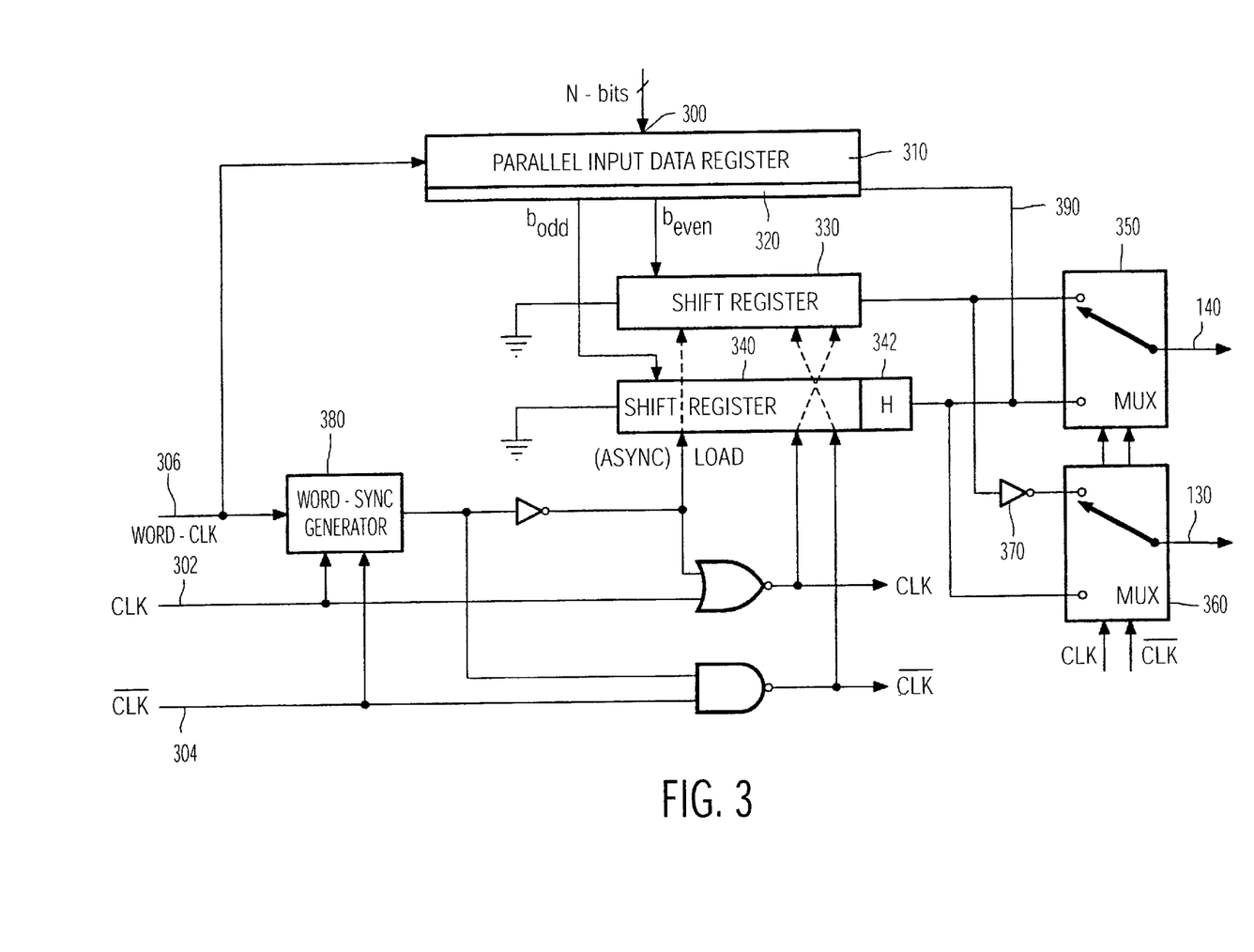
FIG. 3 shows a block diagram of a preferred transmitter circuit.
Figure 4:
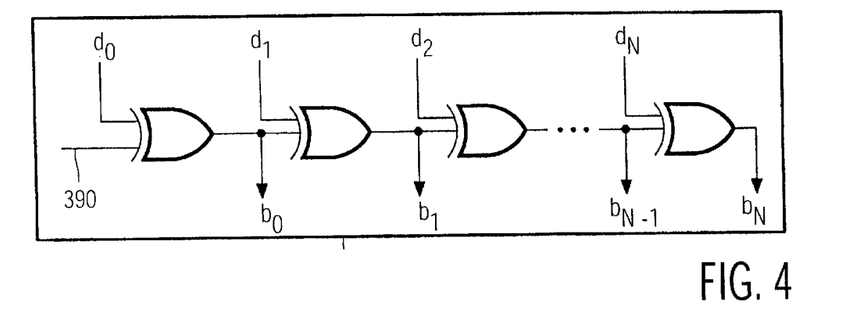
FIG. 4 illustrates an encoding according to the invention.
Figure 5:
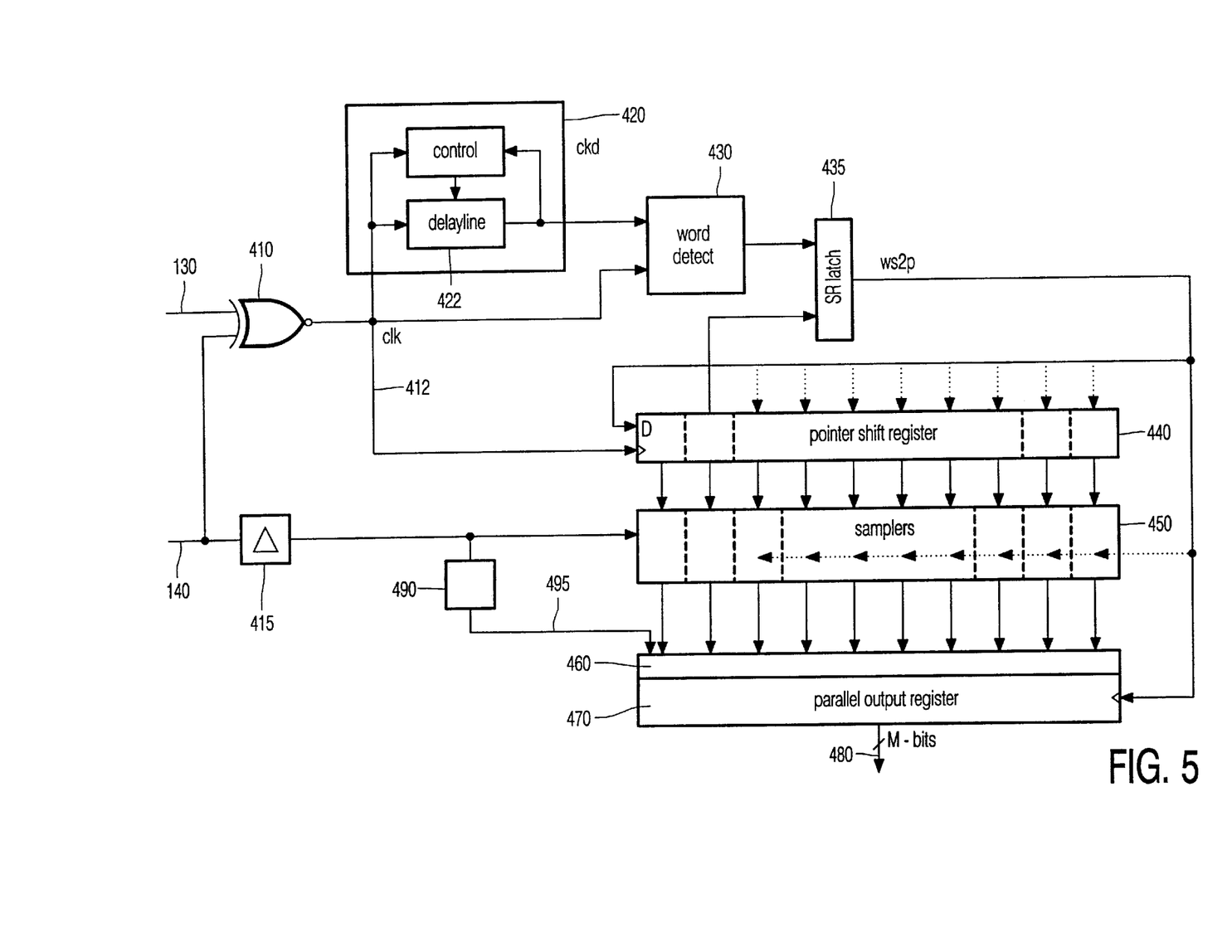
FIG. 5 shows a block diagram of a preferred receiver circuit.

FIGS. 3, 4, and 5 show block diagrams of a preferred embodiment of the transmitter circuit 110 and receiver circuit 120. The shown embodiments operate at the half-clock frequency, support variable length words, automatic truncating/complementing of word in the receiver and perform the encoding/decoding in parallel (allowing a low frequency coding). It will be appreciated that these features may be used separately. It will also be understood that the underlying principles can equally well be applied to the coding/encoding as shown in U.S. Pat. No. 5,341,371.

FIG. 3 shows a block diagram of a preferred embodiment of the transmitter circuit 110. For this block diagram it is assumed that a word in the transmitter circuit 110 comprises N data bits 300, which are stored in a parallel input data register 310 of the transmitter circuit 110. If desired, a serial stream of data bits may first be converted for storage in the parallel register 310 in a known manner. It is further assumed that a clock signal clk 302 and inverted clock signal clkn 304 are available. Both clock signals are used to allow the use of a half-frequency clock. A further word-clk signal 306 is assumed to be available. This signal directly or indirectly indicates the end of the supply of all data bits of a word via signal 300 to the receiver circuit 110. In the shown embodiment, the word-clk signal 306 is used for clocking the data in a parallel formn into the input data register 310. As such, the word-clk signal 306 is also used for controlling that the data bits are retrieved from the parallel input data register 310, encoded by the logic 320 to N encoded values (signal levels) and divided over two shift registers 330 and 340. In the example, the odd-numbered encoded values are stored in the 'odd' shift register 340 and the even-numbered encoded values are stored in the 'even' shift register 330. Multiplexers 350 and 360 supply an encoded value as the respective encoded values 130 and 140. The multiplexers 350 and 360 are switched under control of the half-frequency clk 302 and clkn 304, respectively, to extract an encoded value from either the odd shift register 340 or the even shift register 330. By using two complementary shift register, the half frequency clock signals can be used to output a full frequency data stream. In the example shown, the encoding by logic 320 produces the signal levels for the second signal 140. The signal levels for the first signal 130 can simply be derived from these signals by using an inverter 370 to invert the even-numbered signal levels (assuming that numbering starts at bit 0), as has been described above in more detail.

A word-sync generator 380 ensures that, in response to a word end indicated by the word-clk signal 306, the clock signals are blocked from shifting the shift register 330 and 340. In the shown example, it is assumed that the word-size is such that at that moment the multiplexers 350 and 360 are switched to the odd register 340. This register has one additional cell 342 for holding the last output level, which is not cleared while the levels for the new word are being loaded. In this way the signal levels 130 and 140 are kept constant. The multiplexers 350 and 360 are switched under control of the clock signals that can be blocked under control of the word-sync generator 380 to disable switching after the word end. It will be appreciated that, if both odd-size and even-size words can be transmitted by the transmitter circuit 110, both registers 330 and 340 preferably comprise a holding cell. The held output level of the second signal 130 is fed-back as signal 390 to the encoder logic 320 to enable a proper encoding of the level for the first data bit of the next word. This assumes that in between words the first and second signals are kept at the last output level. So, the new word is encoded relative to the last word. If the end of the word is indicated using fixed default levels (e.g. a low level) of the signals, then the feedback signal 390 is not required.

FIG. 4 illustrates the encoding block 320. As has been described above in more detail, for the second signal 140 each next level is formed as an XOR of the current level with the data bit to be transferred. If $b_i$ indicates the level of the second signal 140 for data bit $d_i$, then $b_{i+1}$=XOR $(b_i, d_{i+1})$, for i=1 to N−1 as shown in FIG. 4. In line with the example of FIG. 3, the first level $b_0$ is determined as the XOR of $d_0$ and the feedback signal 390, which represents the current level of the second signal 140.

FIG. 5 shows a block diagram of a preferred embodiment of the receiver circuit 120. Using an XOR function 410, the half-period clock signal is retrieved from the first signal 130 and the second signal 140. A delay control loop 420 comprises a delay-line 422, for delaying the recovered clock signal by two data bit periods, i.e. one full clock period. The word-end detector 430 uses the recovered clock and delayed clock to detect that an edge in the recovered clock is missing, indicating the end of a word. In response a word-select signal (ws) is generated, causing an enable value to be loaded in a pointer shift register 440. Under control of the recovered clock signal the enable value is shifted through the shift register 440. Depending on the location of the enable value in the shift register one of the samplers of a parallel sample register 450 is enabled to sample and hold the level of the second signal 140. The word-select signal also controls resetting of the shift register 440 to remove the enable value, which may in principle be at any position in the shift register 440 if a short word was received. The new enable value is only loaded after the reset of the shift register 440 has been completed, or alternatively, the first cell(s) of the shift register 440 is not reset. Under control of the word-select signal, the sampled levels are transferred in parallel through a decoder 460 to a parallel output register 470. The sample register 450 may be partly or entirely reset if successive data words can have different lengths. Otherwise, locations of the sample register which are guaranteed to be reloaded by new samples of the next word need not be reset. The retrieved data 480 is output from the output register 470. A separate sample 490 is used for holding the last sampled level of the second signal 140. This sampled level is supplied as a signal 495 to the decoder 460 for decoding the first bit of the message. Decoding itself is straightforward. Assuming that the sampled levels as stored in the sample register 450 are numbered $b_0$ to $b_N$, where $b_0$ represents the MSB data bit, the corresponding data bits $d_0$ to $d_N$ are retrieved as follows. Recalling that a change of level of the second signal 140 implies a "1" data bit, in fact the data bit value can be retrieved as the XOR or two successively sampled levels of the second signal 140. So, if $b_i$ indicates the level of the second signal 140 for data bit $d_i$, then $d_{i+1}$=XOR $(b_i, b_{i+1})$, for i=1 to N−1. Assuming that the first level of a word is coded relative to the last level of the immediately preceding word, $d_0$ can be retrieved as the XOR of $b_0$ and the signal 495. An optional delay 415 may be added to compensate for different propagation delays of the restored clock signal and the levels provided to the samplers, representing the encoded data. The latch 435 ensures synchronization of the word end/reset. The word-select signal triggers the word end, which also results in resetting of some of the cells of the sampler register 450 and the shift register 440. Preferably, the reset is terminated by the enable value in the shift register 440. In the shown embodiment, It is assumed that each message comprises at least two data bits. As such, the first two cells of the shift register 440 and the sample register 450 need not be reset. It is ensured that the reset is terminated by supplying a signal from the shift register 440 to the latch 435 when the enable value has been shifted to the second cell of the shift register 440.

For the above embodiments, the encoder and decoder have been described as directly representing the data bits $d_i$ as signal levels on signals 130 and 140, where XOR functions were used to transfer data bits to the encoded signal and vice versa. It also will be appreciated that other binary logic may be used. As such, in a more general form the transmitter circuit 110 causes a transition of the first signal 130 at a data bit boundary preceding data bit d of the data message if a function f(d) of the data bit d has a first value (e.g. "0") and causes a transition of the second signal at the data bit boundary if the function f(d) has a different second value (e.g. "1"). Such a function may be very simple and integrated with the encoding/decoding. For example, the function f(d) may be a binary combination of the data bit d with one or more bits of a predetermined codeword. Taking a codeword of the same length as the data word to be transmitted, the function f may combine each data bit with a corresponding bit of the codeword, using an XOR function. Using such a binary function, in fact the first signal 130 can be seen as representing that the data bit to be transmitted is equal to the corresponding bit of the codeword, whereas the second signal 140 represents that the data bit is unequal to the codeword bit. It will be appreciated that alternative functions may also be used. Moreover, also functions which provide output at more than two values may be used, particularly if more than two signals or more than two signal levels are used for transferring the data.

What is claimed is:

1. A serial communication system comprising: at least one transmitter circuit and at least one receiver circuit interconnected via a communication medium; the communication medium providing at least a first and a second parallel signal carrier for transporting a respective first and second signal from the transmitter circuit to the receiver circuit;

the transmitter circuit comprising means for, in synchronization with a clock signal, serially representing a combination of the clock signal and data item(s) of a data message as the first and second signal such that at a data item boundary a signal transition occurs in either the first or the second signal; and the transmitter circuit is operative to cause a transition of the first signal at a data item boundary preceding data item d of the data message if a function f(d) of the data item d has a first value and to cause a transition of the second signal at the data item boundary if the function f(d) has a different second value, and the receiver circuit comprising means for recovering the clock signal by detecting and combining signal transitions of the first and second signal and for receiving the data message from the first and/or the second signal;
characterized in that the data item is a data bit and that the receiver circuit comprises first data bit recovery means which is operative to:

sample the first signal in synchronization with the recovered clock signal;
compare a sampled value $b_{i+1}$ sampled at instant $t_{i+1}$ to a sampled value $b_i$ sampled at an instant $t_i$ immediately preceding instant $t_{i+1}$; and
determine that the function $f(d_{i+1})$ of data bit $d_{i+1}$ has the first value if $b_i \neq b_{i+1}$ and that $f(d_{i+1})$ has the second value if $b_i = b_{i+1}$.

2. The serial communication system as claimed in claim 1, characterized in that the data item is a data bit and that the receiver circuit comprises second data bit recovery means, being operative to:

sample the second signal in synchronization with the recovered clock signal;
compare a sampled value $b_{i+1}$ sampled at instant $t_{i+1}$ to a sampled value $b_i$ sampled at an instant $t_i$ immediately preceding instant $t_{i+1}$;
determine that the function $f(d_{i+1})$ of data bit $d_{i+1}$ has the first value if $b_i = b_{i+1}$ and that $f(d_{i+1})$ has the second value if $b_i \neq b_{i+1}$.

3. The serial communication system as claimed in claim 2, characterized in that the receiver circuit comprises error detection means being operative to detect that an error has occurred if $f(d_{i+1})$ as determined by the first data bit recovery means differs from $f(d_{i+1})$ as determined by the second data bit recovery means.

4. The serial communication system as claimed in claim 1, characterized in that the receiver circuit comprises means for converting a plurality of serial samples to a parallel sample word and performs the comparison of the sampled value $b_{i+1}$ to the sampled value $b_i$ on the parallel samples.

5. The serial communication system as claimed in claim 1, characterized in that f(d)=d.

6. The serial communication system as claimed in claim 1, characterized in that the function f(d) is a binary combination of the data bit d with at least one bit of a predetermined codeword.

7. The serial communication system as claimed in claim 1, characterized in that the transmitter circuit comprises means for transmitting a stream of variable length data messages by, after having completed transmission of a message of the stream, maintaining the first and second signal substantially at a respective constant level for a delay period of at least one data bit period as indicated by the clock signal, and enabling transmission of a following message of the stream after the delay period has expired; and in that the receiver circuit comprises means for determining whether, for substantially more than one data item period, no signal transition occurs in both the first and second signal and, if so, determining that a message has ended.

8. A receiver apparatus comprising a receiver circuit comprising:

means for receiving a first and second signal from a transmitter circuit via parallel signal carriers;
means for recovering a clock signal by detecting and combining signal transitions of the first and second signal; and
means for recovering a data message from the first and/or the second signal;
characterized in that the receiver circuit is operative to determine whether substantially at a data bit boundary, as derived from the recovered clock signal, a transition occurred in the first or the second signal and to determine that a data item with a first value has been received if a transition occurred in the first signal and that a data item with a different second value has been received if a transition occurred in the second signal.

9. A method of serially communicating between at least one transmitter circuit and at least one receiver circuit interconnected via a communication medium; the communication medium providing at least a first and a second parallel signal carrier for transporting a respective first and second signal from the transmitter circuit to the receiver circuit; wherein the method comprises:

in synchronization with a clock signal, serially encoding a combination of the clock signal and data items(s) of a data message as the first and second signal such that at a data item boundary a signal transition occurs in either the first or the second signal; wherein the encoding comprises causing a transition of the first signal at a data item boundary preceding data item d of the data message if a function f(d) of the data item d has a first value and causing a transition of the second signal at the data item boundary if the function f(d) has a different second value;

outputting the first and second signal from the transmitter circuit via the respective first and second signal carriers;

inputting the first and second signals from the respective first and second signal carriers into the receiver circuit;

decoding the first and second signals for recovering the clock signal by detecting and combining signal transitions of the first and second signal; and recovering the data message from the first and/or the second signal;

characterized in that: the data item is a data bit and that the decoding comprises;

sampling the first signal in synchronization with the recovered clock signal;

comparing a sampled value $b_{i+1}$ sampled at instant $t_{i+1}$ to a sampled value $b_i$ sampled at an instant $t_i$ immediately preceding instant $t_{i+1}$; and determining that the function $f(d_{i+1})$ of data bit $d_{i+1}$ has the first value if $b_i \neq b_{i+1}$ and that $f(d_{i+1})$ has the second value if $b_i = b_{i+1}$.

10. The communication method as claimed in claim 9 wherein the data message is recovered from the first and/or second signal.

11. The communication method as claimed in claim 10 wherein f(d)=d.

12. The communication method as claimed in claim 9 wherein the function f(d) is a binary combination of the data bit d with at least one bit of a predetermined codeword.

13. A method of serially communicating between at least one transmitter circuit and at least one receiver circuit interconnected via a communication medium; the communication medium providing at least a first and a second parallel signal carrier for transporting a respective first and second signal from the transmitter circuit to the receiver circuit; wherein the method comprises:

in synchronization with a clock signal, serially encoding a combination of the clock signal and data items(s) of a data message as the first and second signal such that at a data item boundary a signal transition occurs in either the first or the second signal; wherein the encoding step comprises transferring data bits to the encoded signals by means of an XOR function, outputting the first and second signal from the transmitter circuit via the respective first and second signal carriers;

inputting the first and second signals from the respective first and second signal carriers into the receiver circuit;

decoding the first and second signals for recovering the clock signal by detecting and combining signal transitions of the first and second signal; and recovering the data message from the first and/or the second signal as derived from the recovered clock signal;

and the decoding step comprises transforming the encoded signals into the data bits by means of an XOR function, and wherein the encoding comprises causing a transition of the first signal at a data item boundary preceding data item d of the data message if a function f(d) of the data item d has a first value and causing a transition of the second signal at the data item boundary if the function f(d) has a different second value.

14. The serial communication system as claimed in claim 6 wherein the binary combination comprises an XOR operation.

15. The serial communication system as claimed in claim 1 wherein the means for recovering the clock signal detects edges in the first and second signals.

16. A receiver apparatus as claimed in claim 8 wherein the data item is a data bit and the receiver circuit comprises data bit recovery means operative to;

sample one of the first and second signals in synchronism with the recovered clock signal, compare a first sampled value sample at a first instant to a second sample value sampled at a second instant immediately preceding the first instant, and determine whether the data bit has a first or second value based on such comparison.

17. A receiver apparatus as claimed in claim 16 wherein the receiver circuit comprises means for converting a plurality of serial samples to a parallel sample word and performs the comparison on the first and second sampled parallel values.

18. The receiver circuit as claimed in claim 8, characterized in that the receiver circuit comprises means for detecting whether a signal transition occurred in the first and/or the second signal and determining a value of f(d) in dependence on the detection outcome, wherein f(d) is a function of a data item d of the data message.

* * * * *